United States Patent
Le

(10) Patent No.: US 12,458,002 B2
(45) Date of Patent: Nov. 4, 2025

(54) LIVE CRUSTACEAN STORAGE SYSTEM

(71) Applicant: Anh Ngoc Le, Prince Rupert (CA)

(72) Inventor: Anh Ngoc Le, Prince Rupert (CA)

( * ) Notice: Subject to any disclaimer, the term of this patent is extended or adjusted under 35 U.S.C. 154(b) by 80 days.

(21) Appl. No.: 18/503,584

(22) Filed: Nov. 7, 2023

(65) Prior Publication Data

US 2025/0143270 A1 May 8, 2025

(51) Int. Cl.
*A01K 63/04* (2006.01)
*A01K 63/02* (2006.01)

(52) U.S. Cl.
CPC ............ *A01K 63/042* (2013.01); *A01K 63/02* (2013.01)

(58) Field of Classification Search
CPC .... A01K 63/042; A01K 63/02; A01K 1/0245; A01K 1/031; A01K 61/59; A01K 61/90; A01K 63/00; A01K 1/03; A01K 61/00; A01K 63/04; A01G 31/06; A01G 31/00; A01G 31/04; A01G 18/62
USPC ................ 119/201; 220/601, 607, 640, 676; 248/65
See application file for complete search history.

(56) References Cited

U.S. PATENT DOCUMENTS

| | | | |
|---|---|---|---|
| 5,117,777 A * | 6/1992 | Takasugi | A01K 63/02 119/203 |
| 6,640,749 B1 * | 11/2003 | Monnier | A01K 63/02 119/201 |
| 7,237,509 B2 * | 7/2007 | Bonner | A01K 63/003 119/455 |
| 9,497,907 B2 * | 11/2016 | Anderson | A01G 31/02 |
| 11,206,817 B2 * | 12/2021 | Kemp | A01K 61/59 |
| 11,612,111 B1 * | 3/2023 | Kung | A01G 31/04 47/63 |
| 2006/0185611 A1 * | 8/2006 | Copeland | A01K 1/031 119/419 |
| 2008/0282990 A1 * | 11/2008 | Conger | A01K 1/031 119/417 |
| 2010/0313813 A1 * | 12/2010 | Brocca | A01K 5/0266 119/57.92 |
| 2015/0342156 A1 * | 12/2015 | Sheriff | A01K 61/59 119/211 |
| 2020/0383287 A1 * | 12/2020 | Klein | A01G 31/06 |
| 2022/0287256 A1 * | 9/2022 | Clemmer | A01G 24/20 |

(Continued)

FOREIGN PATENT DOCUMENTS

EP 1099376 A2 * 5/2001 ............ A01K 1/031

*Primary Examiner* — Zoe Tam Tran
(74) *Attorney, Agent, or Firm* — Orin Del Vecchio

(57) ABSTRACT

A live crustacean storage system that is configured to maintain an environment that provides a significant increase in morbidity rate for crabs and other species while disposed in the storage bin of the present invention. The present invention includes a plurality of storage bins wherein the storage bins have an interior volume configured to have crabs disposed therein. The storage bins include an air and water hose assembly wherein the air and water hose assembly provides introduction of air and water into the storage bin proximate the bottom. A shelving assembly is included and is configured to receive and store the storage bins. A plurality of water pumps provide water to funnel members wherein the funnel members are operably coupled to the storage bins located a level below the funnel members. Each storage bin has superposed thereon a cage perimeter member and a removable cage member.

8 Claims, 16 Drawing Sheets

(56) References Cited

U.S. PATENT DOCUMENTS

| | | | |
|---|---|---|---|
| 2023/0115244 A1* | 4/2023 | Torcellini | A01K 1/031 119/51.04 |
| 2023/0200359 A1* | 6/2023 | Russek | A01K 61/85 119/263 |

* cited by examiner

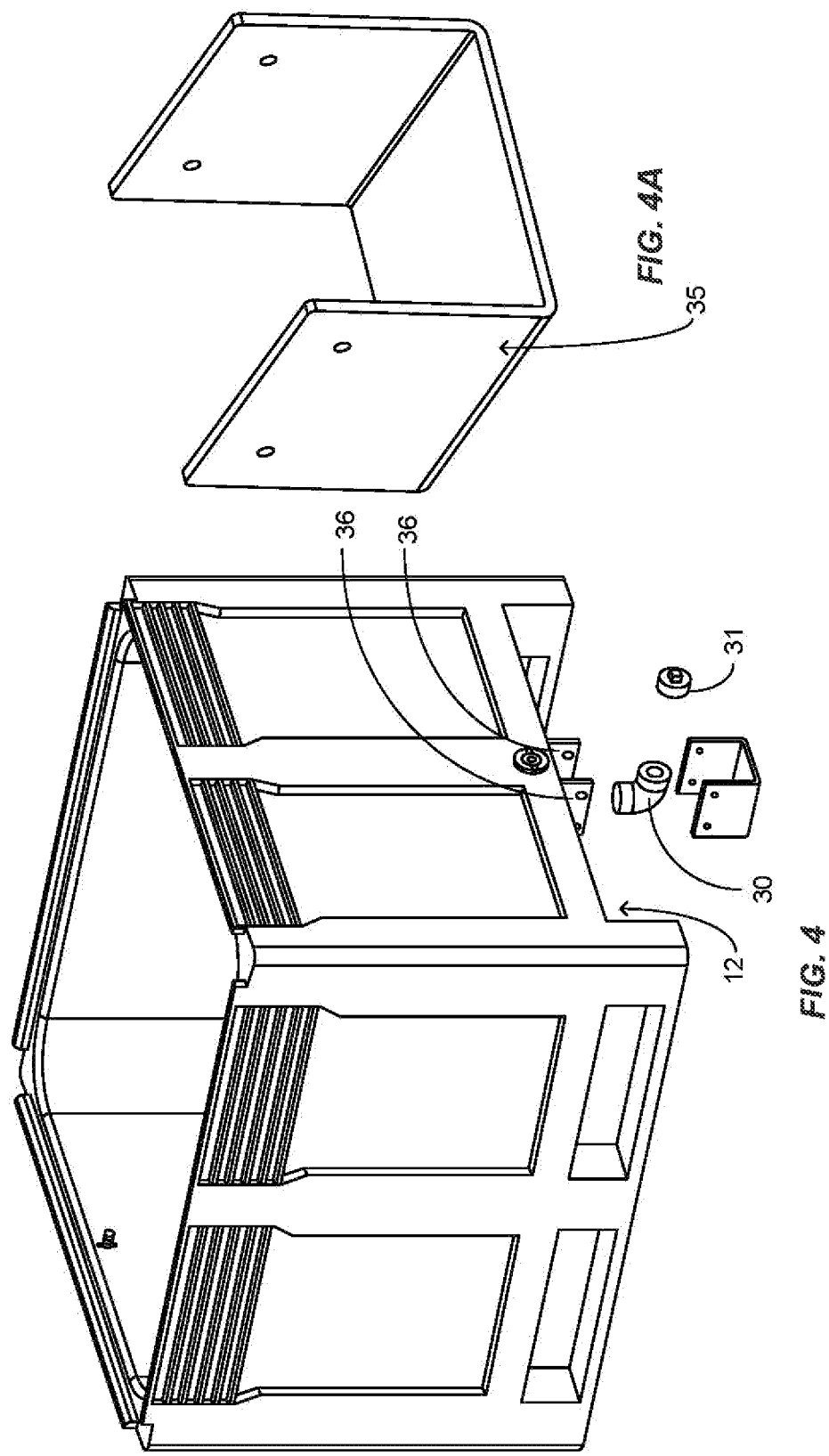

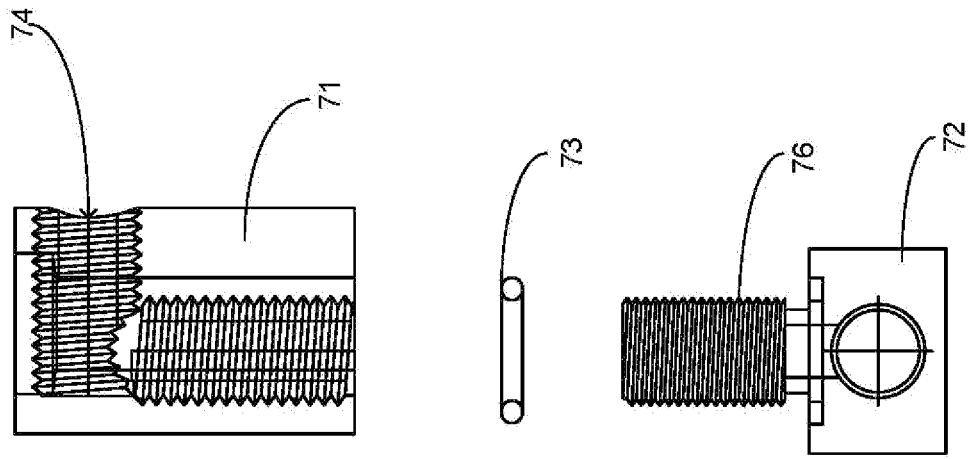
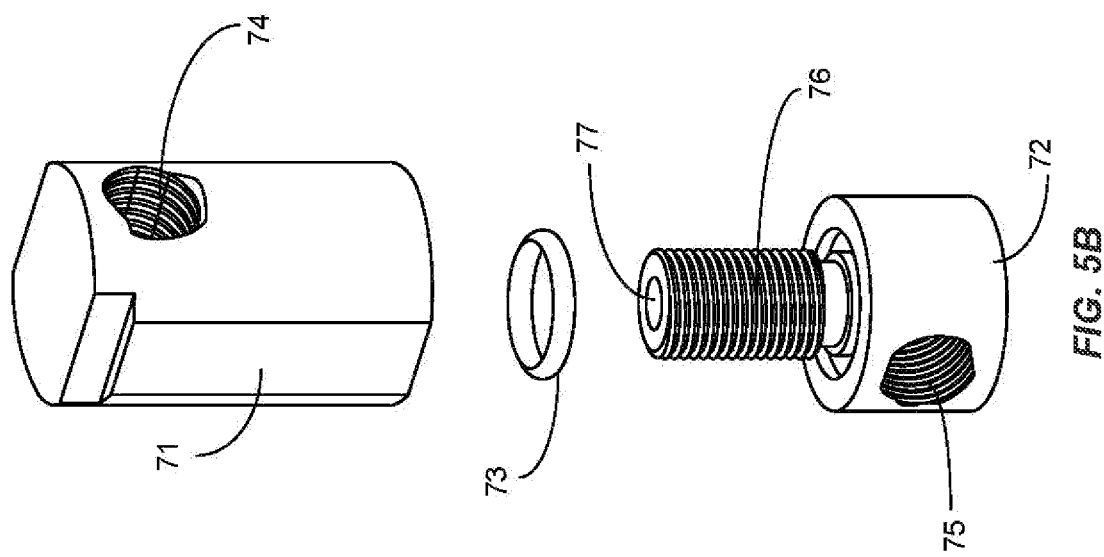
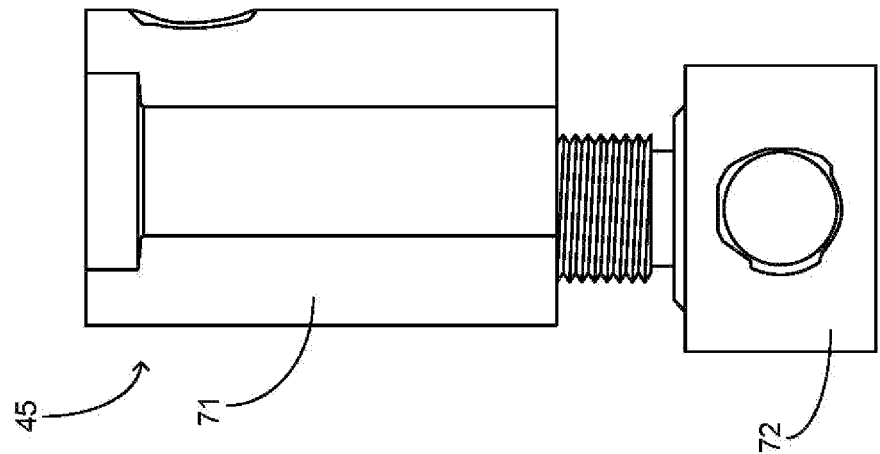

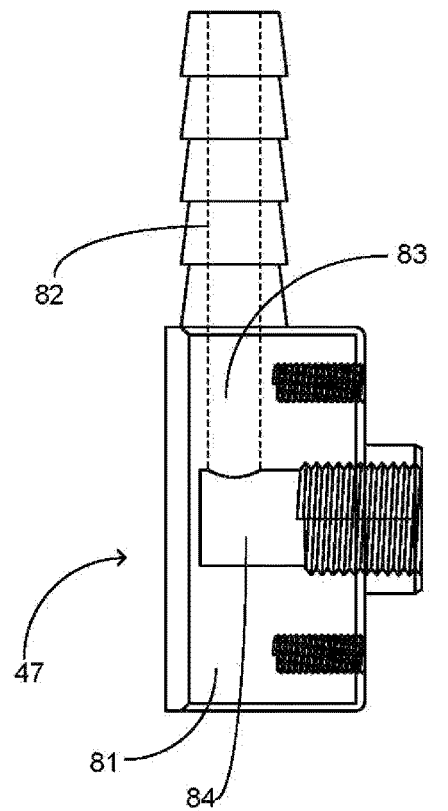
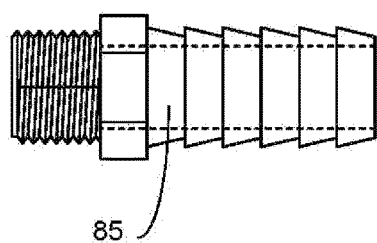
*FIG. 6A*
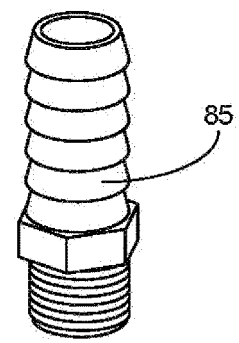
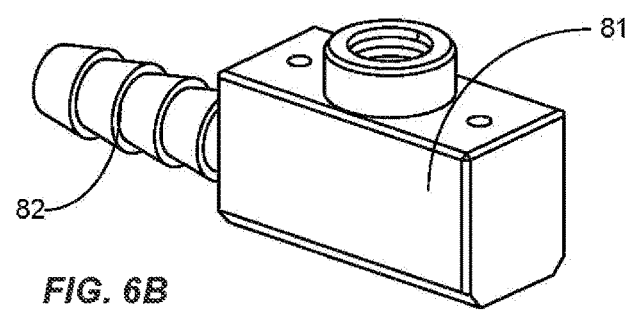
*FIG. 6B*

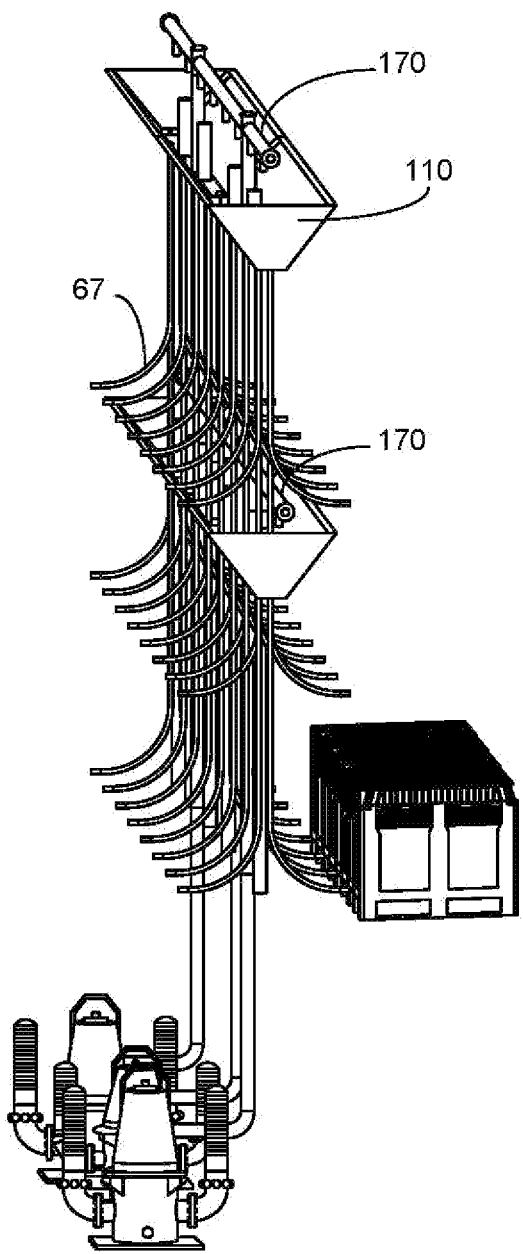
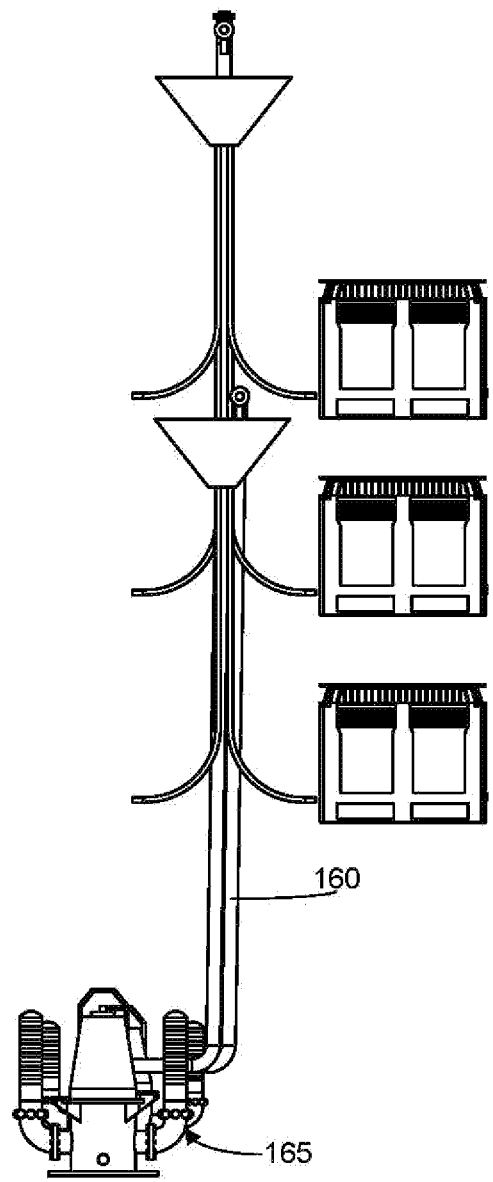
FIG. 11A
FIG. 11B

LIVE CRUSTACEAN STORAGE SYSTEM

FIELD OF THE INVENTION

The present invention relates generally to live animal storage and transportation, more specifically but not by way of limitation, a storage apparatus and system for storing and transporting live crabs wherein the present invention provides a favorable environment so as to dramatically decrease the death rate of the crabs during storage and transportation.

BACKGROUND

Globally, seafood import-export activity is a multi-billion dollar a year industry, supporting a large live transport industry for shellfish, including decapod crustaceans. While the seafood economy continues to grow, live transport poses profound challenges to animal welfare which impacts parameters such as but not limited to product quality and death rate of the decapod crustaceans during transport which adversely affects profit margins. Live transport is a popular choice for suppliers seeking to prolong freshness. However, any advantage live transport offers can only be realized when animals are properly and humanely transported using methods that minimize negative impacts. While stock species demonstrate varied resilience to live transport, all decapod species are prone to harmful stressors experienced during live handling and transport. Practices that may have been in use for many years have been somewhat successful but still the survival rate is not where the industry needs it to be for the long term.

During live transportation, decapods face many significant welfare challenges that can lead to stress, injury, muscle depletion, physiological and immunological disturbances, morbidity and mortality. Without holding and storage methods and facilities that are specifically adapted to each species' unique biological needs, decapods suffer the negative effects of exposure to inappropriate temperatures and poor water quality, overcrowding, mixing with other species and rough handling. All these welfare impacts are exacerbated by long journey durations and multiple transfer procedures. When transporting live decapods, overcrowding and inappropriate mixing of species are particular welfare concerns. As a general rule, immersion pre-transport is recommended. Purging, especially for prolonged periods, can lead to welfare concerns and may only be advisable if transport containers lack effective water flow systems capable of removing nitrogenous waste in transit.

Accordingly, there is a need for a crab storage and transportation system that has improved environmental conditions so as to facilitate a reduced mortality rate of crabs and other crustaceans during transport.

SUMMARY OF THE INVENTION

It is the object of the present invention to provide a storage system for live crustaceans so as to retain freshness and reduce morbidity rates wherein the present invention employs a storage bin that is comprised of a plurality of walls and bottom forming an interior volume.

Another object of the present invention is to provide a storage system for crabs that provides an optimum condition for sustaining the life of the crabs while disposed therein wherein the storage bin of the present invention includes an upper cage member and a cage perimeter member.

A further object of the present invention is to provide a storage system for live crustaceans so as to retain freshness and reduce morbidity rates wherein the present invention wherein the storage bin includes a water introduction component that provides the necessary water to the interior volume of the storage bin.

Yet a further object of the present invention is to provide a storage system for crabs that provides an optimum condition for sustaining the life of the crabs while disposed therein that further includes an air introductory component that provides introduction of air into the interior volume of the storage bin.

Still another object of the present invention is to provide a storage system for live crustaceans so as to retain freshness and reduce morbidity rates wherein the present invention further includes a shelving assembly that is configured to have a plurality of storage bins operably disposed thereon.

An additional object of the present invention is to provide a storage system for crabs that provides an optimum condition for sustaining the life of the crabs while disposed therein wherein the water introduction component includes a pipe network proximate the bottom of the interior volume of the storage bin.

Yet a further object of the present invention is to provide a storage system for live crustaceans so as to retain freshness and reduce morbidity rates wherein the air introduction element includes a pipe network separate from the pipe network of the water introduction system.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

FIG. 4 is a perspective view of the storage bin of the present invention; and FIG. 4A is a perspective view of the drainage bracket; and FIG. 5A is a front view of the top air line adapter; and FIG. 5B is a perspective exploded view of the top air line adapter; and FIG. 5C is a side exploded view of the top air line adapter; and FIG. 6A is a side exploded view of the lower air line adapter; and FIG. 6B is a perspective exploded view of the lower air line adapter; FIG. 9A top view of the interior volume of the storage bin.

FIG. 11A is an end perspective view of the air and water supply assembly operably coupled to storage bins; and FIG. 11B is an end view of the air and water supply assembly operably coupled to storage bins.

DETAILED DESCRIPTION

Figure 1:
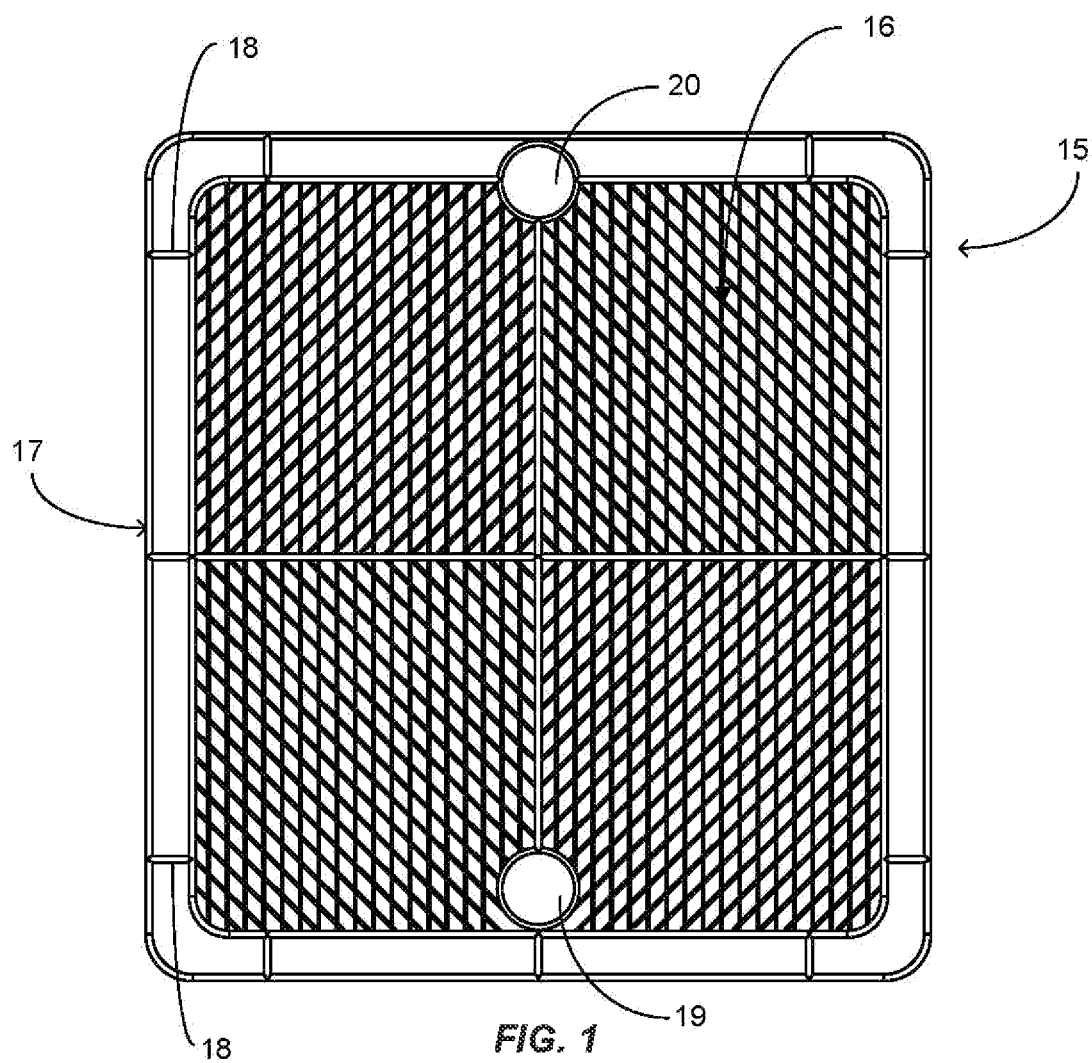
FIG. 1 is a top view of the cage member of the present invention.
Figure 2:
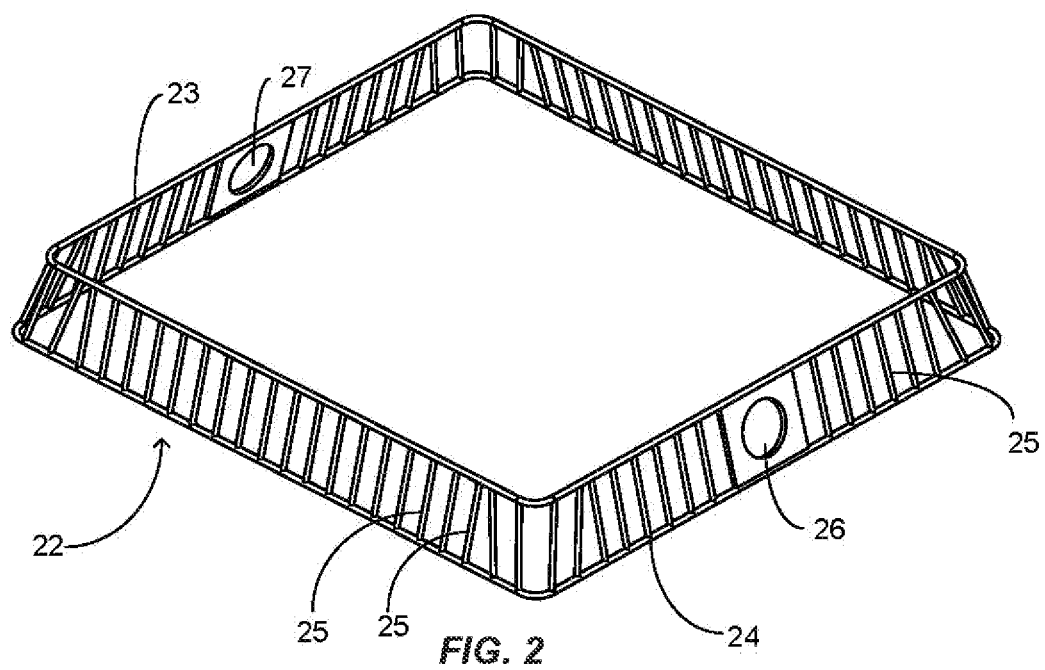
FIG. 2 is a perspective view of the perimeter member of the present invention.
Figure 3A:
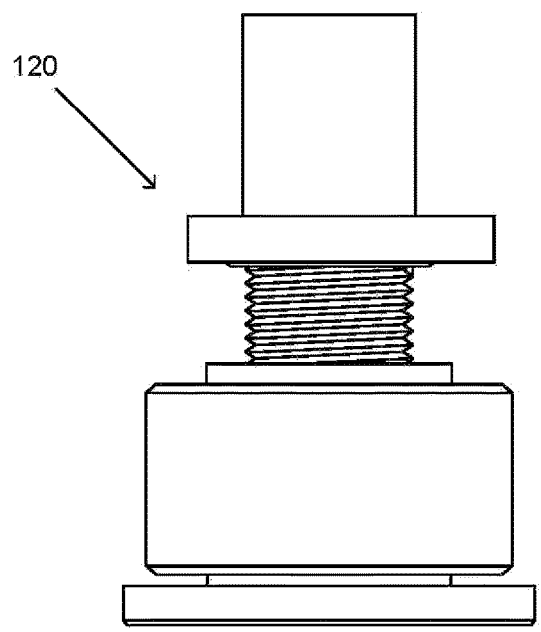
FIG. 3A is a side view of the stopper water valve assembly.
Figure 3B:
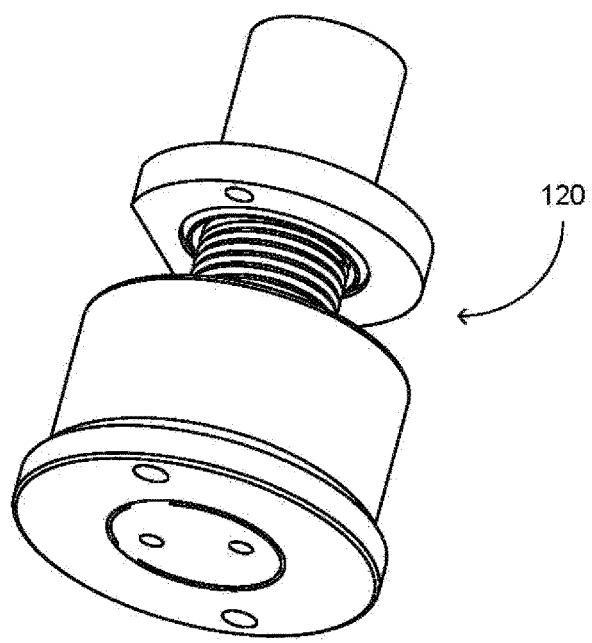
FIG. 3B is a perspective view of the stopper water valve assembly.
Figure 3C:
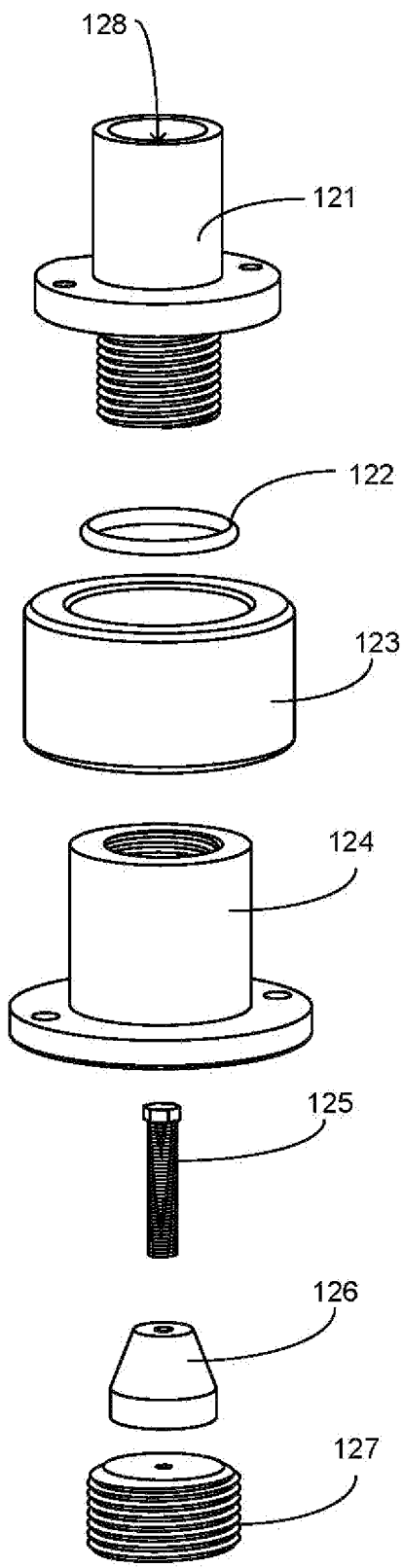
FIG. 3C is a perspective exploded view of the stopper.
Figure 3D:
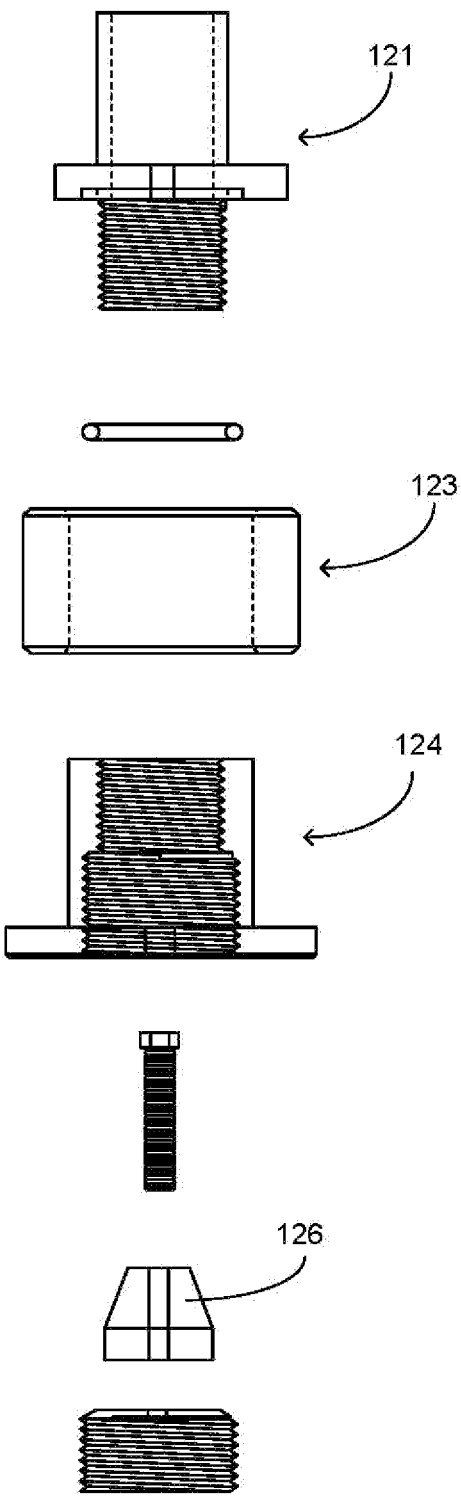
FIG. 3D is a side exploded view of the stopper.

Referring now to the drawings submitted herewith, wherein various elements depicted therein are not necessarily drawn to scale and wherein through the views and figures like elements are referenced with identical reference numerals, there is illustrated a live crustacean storage system 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Referring in particular to the Figures submitted herewith, the live crustacean storage system 100 includes a plurality of storage bins 10. The storage bins 10 are formed from four walls 11 and a bottom 12 being integrally formed creating an interior volume 13. It should be understood within the scope of the present invention that the storage bin 10 is manufactured from a suitable durable material such as but not limited to plastic. It should be further understood within the scope of the present invention that the storage bin 10 could be provided in alternate sizes. Lastly, while the preferred embodiment illustrated herein is square in shape, it should be understood within the scope of the present invention that the storage bin 10 could be provided with an alternate quantity of walls and as such an alternate shape. By way of example but not limitation, the storage bin 10 could have one wall and be annular in shape.

Releasably secured to the storage bin 10 proximate the upper perimeter edge 14 is cage member 15. Cage member 15 provides coverage of the opening 9 of the storage bin 10. The cage member 15 is manufactured from suitable material such as but not limited to metal and in a preferred embodiment of the present invention the cage member 15 includes center portion 16 that is manufactured from wire mesh. The cage member 15 includes perimeter rail member 17 that is coupled to the center portion 16 utilizing support members 18. The perimeter rail member 17 is configured to extend beyond the top rail member 23 of the cage perimeter member 22. Cage member 15 further includes a first aperture 19 and second aperture 20 located on opposing sides of the cage member 15. The first aperture 19 and second aperture 20 are present to allow air and water lines to be journaled therethrough and provide ability to place cage member 15 completely over the opening 9. It should be understood within the scope of the present invention that the cage member 15 could be provided with alternate quantities of apertures in order to accommodate air and/or water hoses. A cage perimeter member 22 is provided and is configured to have the cage member 15 superposed thereon. The cage perimeter member 22 includes the top rail member 23, bottom rail member 24 having support members 25 therebetween. The cage perimeter member 22 is angularly oriented such that the top rail member 23 is positioned inwards towards the storage bin 10. The cage perimeter member 22 further includes a first aperture 26 and second aperture 27 that are aligned with first aperture 19 and second aperture 20 in order to accommodate air and/or water hoses therethrough.

The storage bin 10 has a drain valve 30 formed in the bottom 12. The drain valve 30 functions to facilitate removal of water from the interior volume 13 of the storage bin 10. Drain valve 30 is L-shaped in order to facilitate a desired direction of water flow therefrom. The drain valve 30 includes a stop member 31 that is releasably coupled to the drain valve 30. Removal of the stop member 31 will initiate drainage of any water disposed in the interior volume 13 of the storage bin 10. The drain valve mounting bracket 35 is a square u-shaped bracket manufactured from a suitable rigid material. The drain valve mounting bracket 35 is configured to be operably coupled to support members 36 in order to facilitate mounting and support of the drain valve 30. It should be understood within the scope of the present invention that alternate elements could be provided in order to provide an ability to drain water from the interior volume 13 of the storage bin.

Figure 7A:
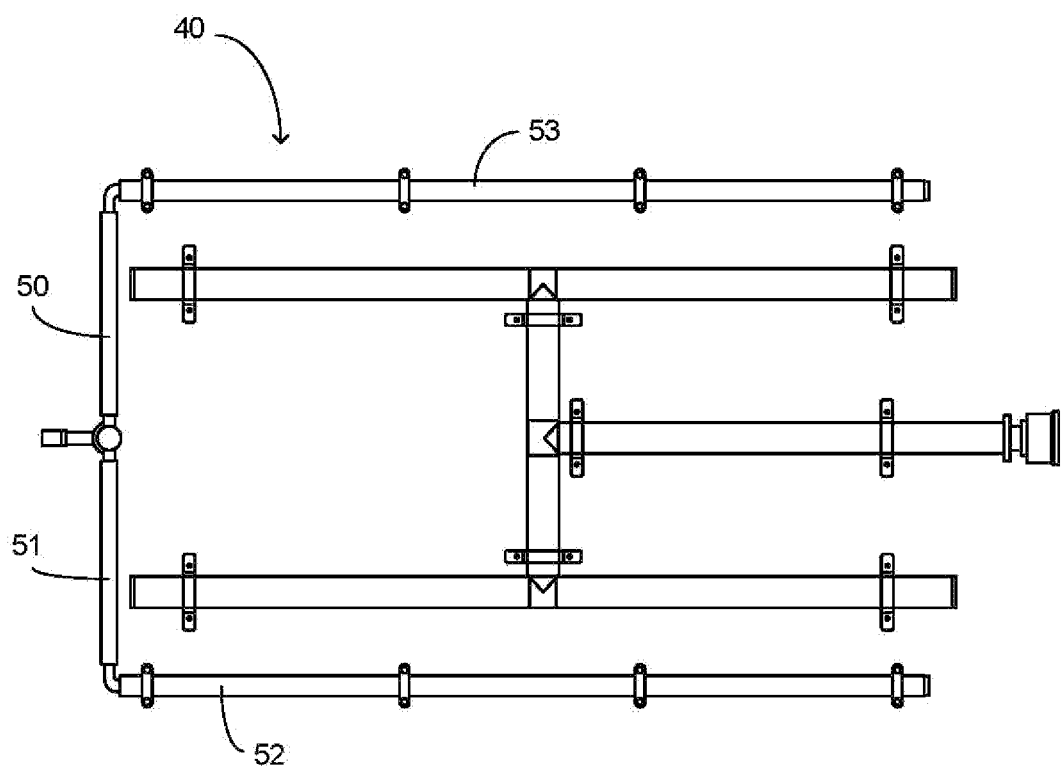
FIG. 7A is a top view of the water and air pipe assembly.
Figure 7B:
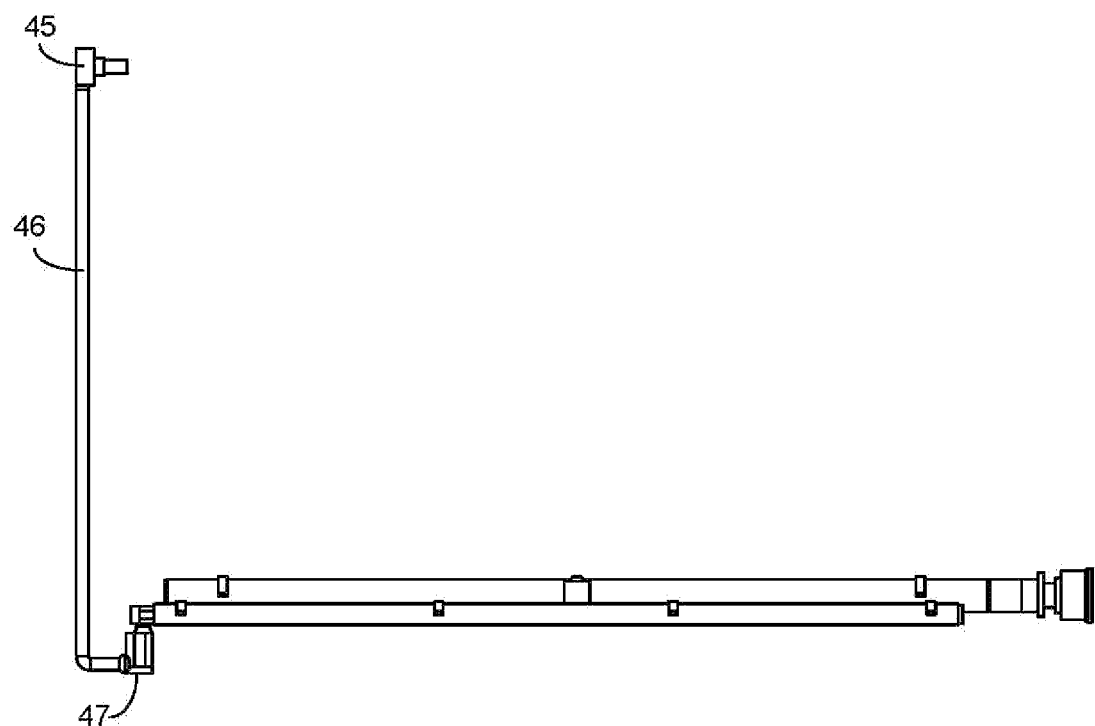
FIG. 7B is a side view of the water and air pipe assembly.
Figure 7C:
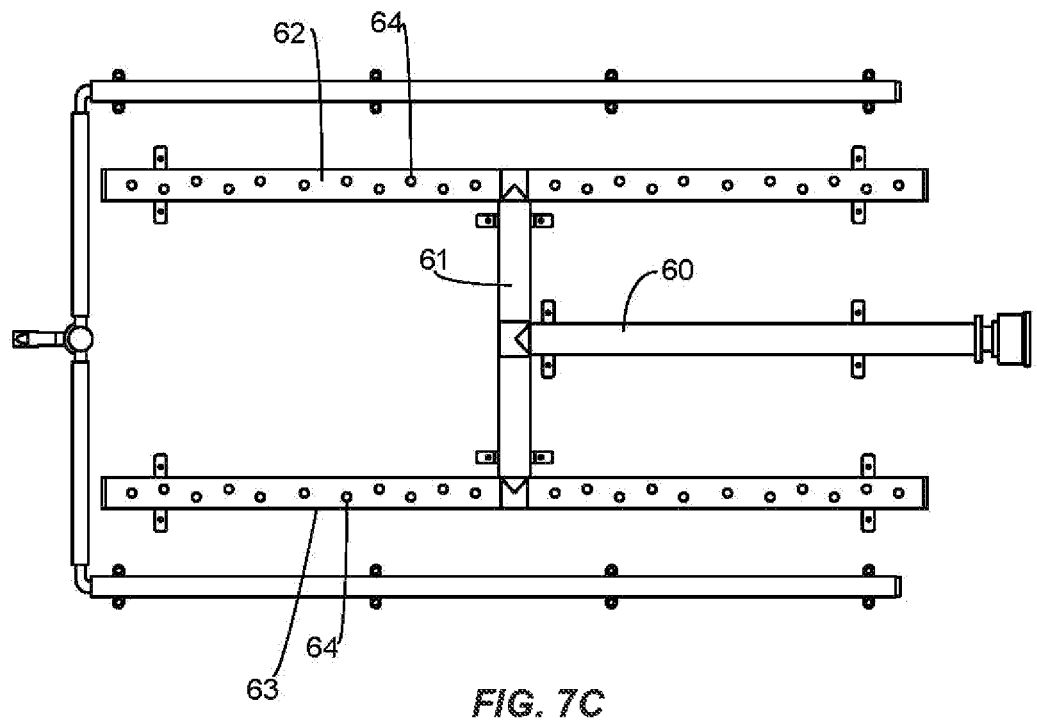
FIG. 7C is a bottom view of the water and air pipe assembly illustrating water introduction apertures.
Figure 8A:
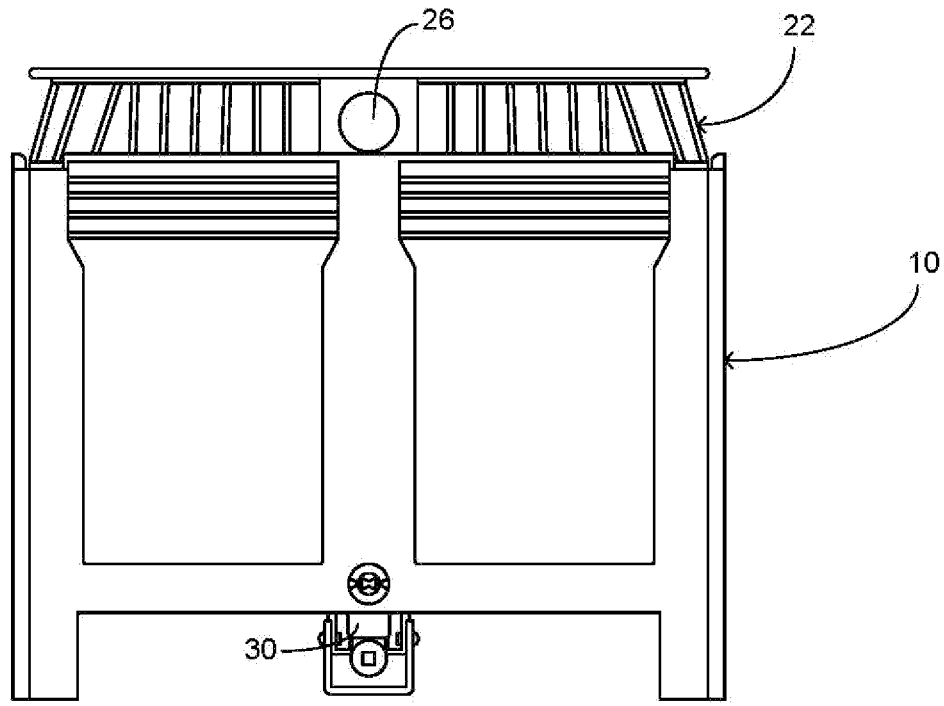
FIG. 8A is a front view of the storage bin of the present invention.
Figure 8B:
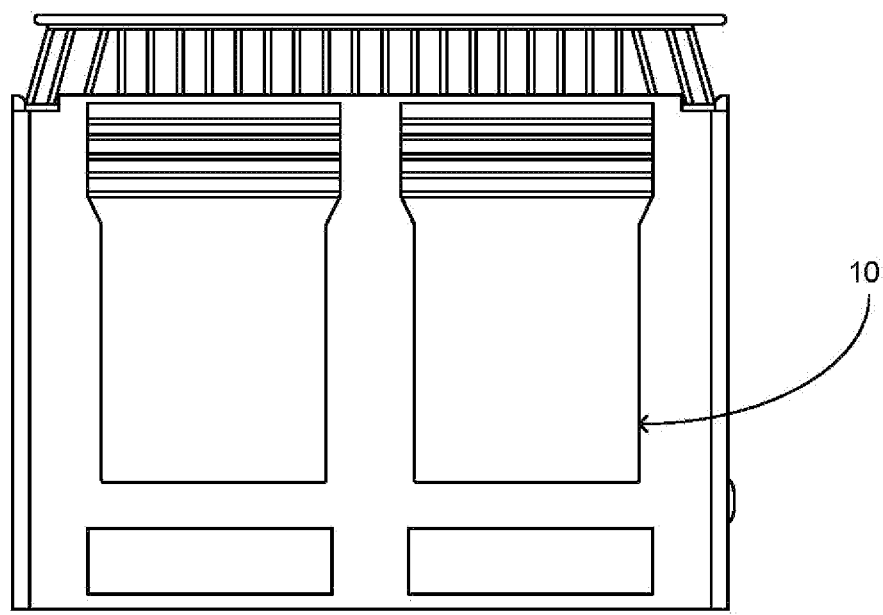
FIG. 8B is a side view of the storage bin of the present invention.
Figure 8C:
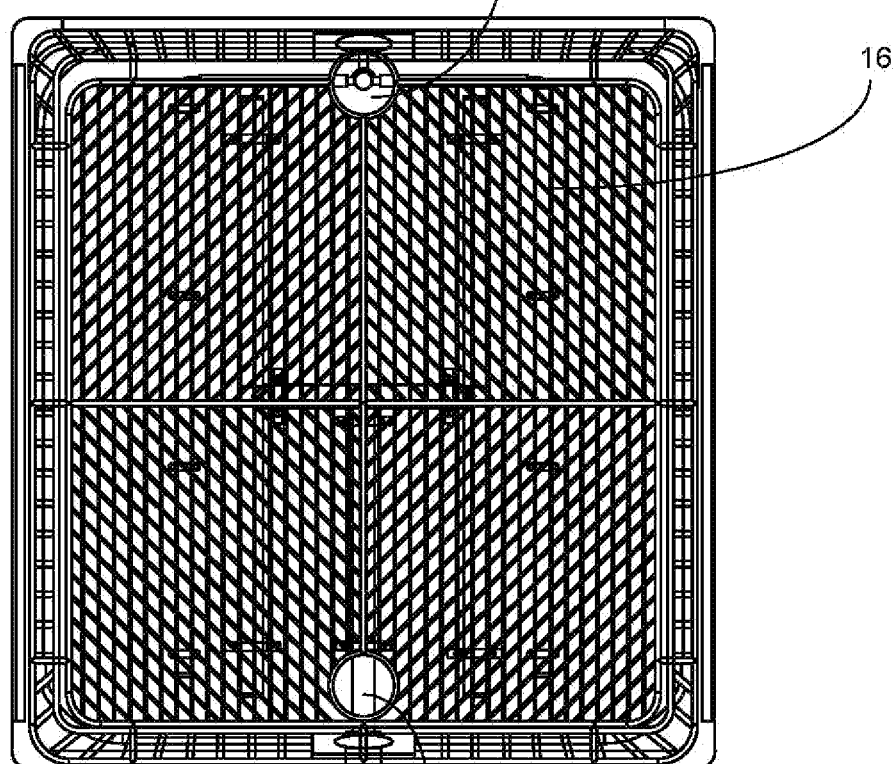
FIG. 8C is a top view of the storage bin of the present invention.
Figure 8D:
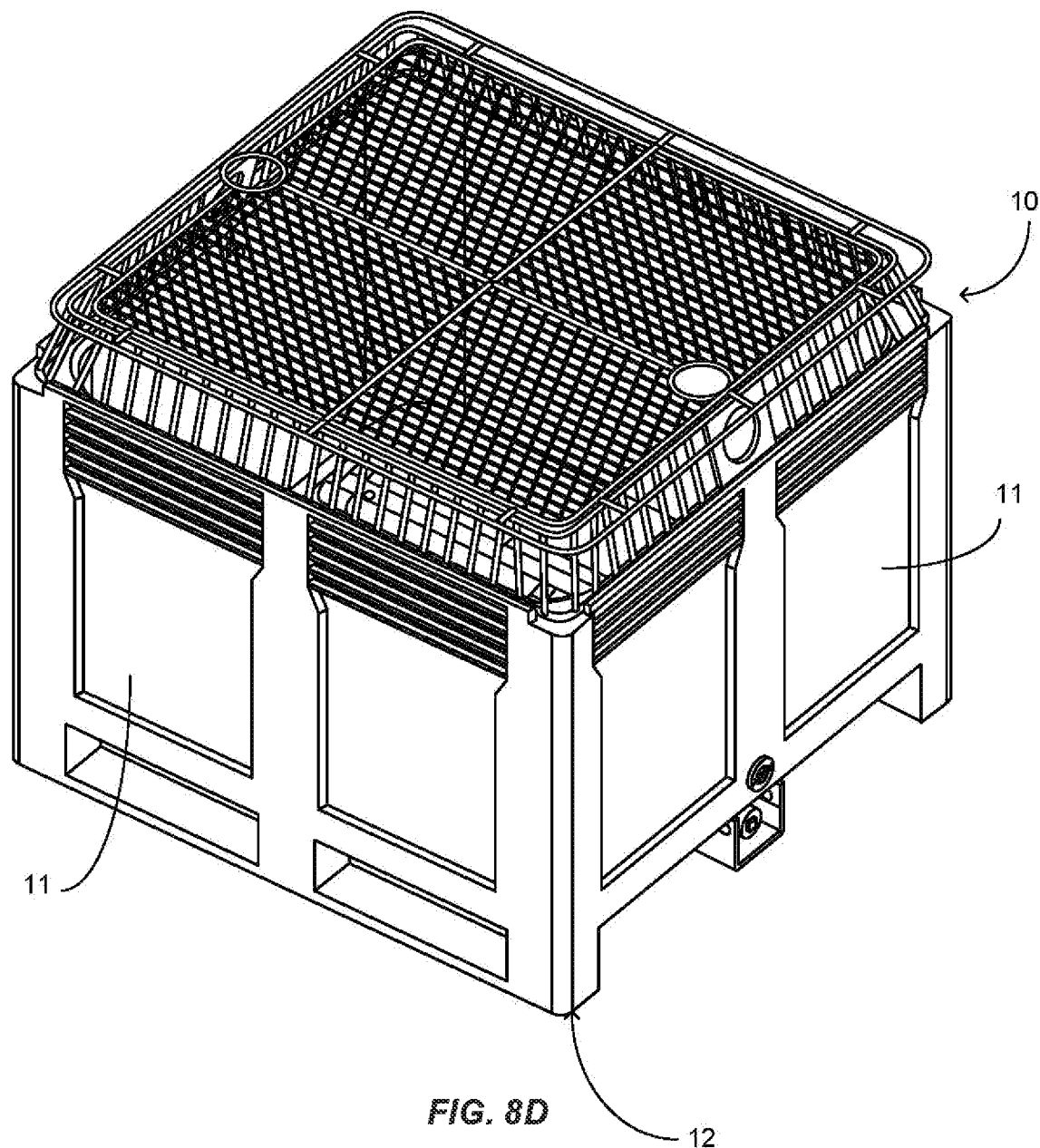
FIG. 8D is a perspective view of the storage bin of the present invention.
Figure 9A:
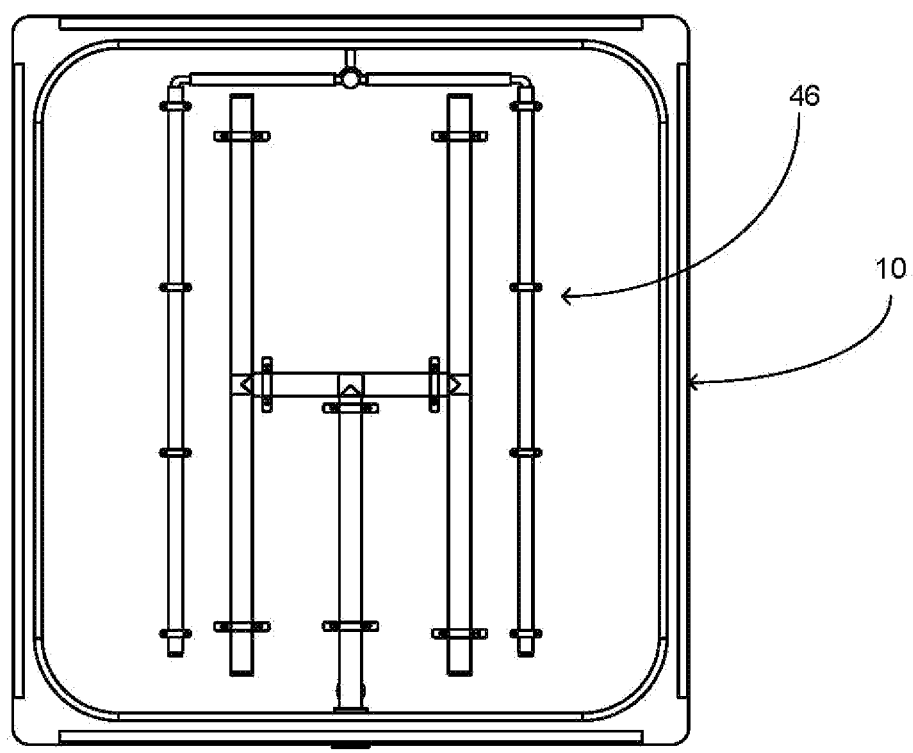
Figure 9B:
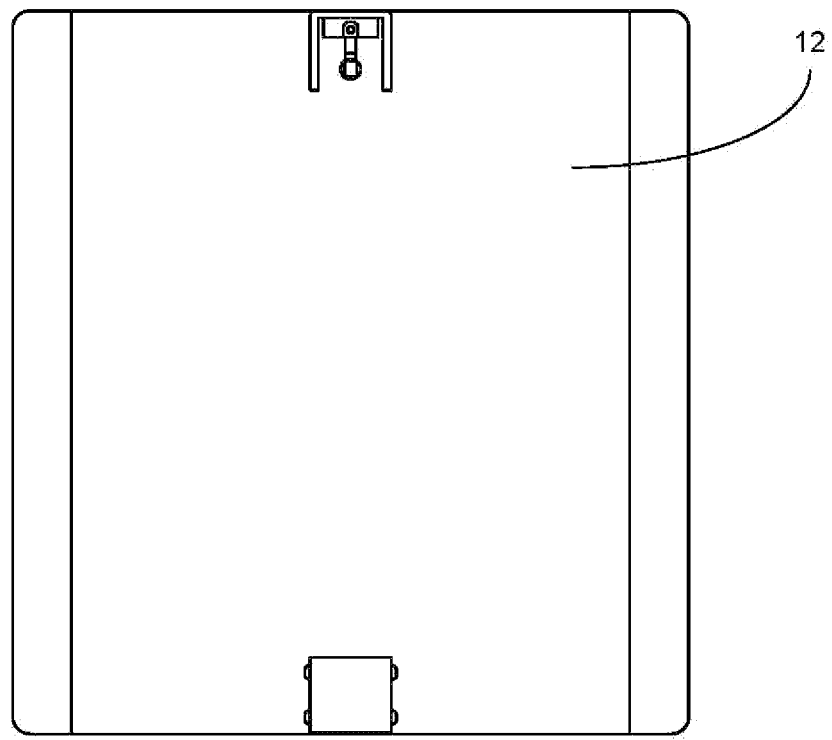
FIG. 9B is bottom view of the storage bin.
Figure 9C:
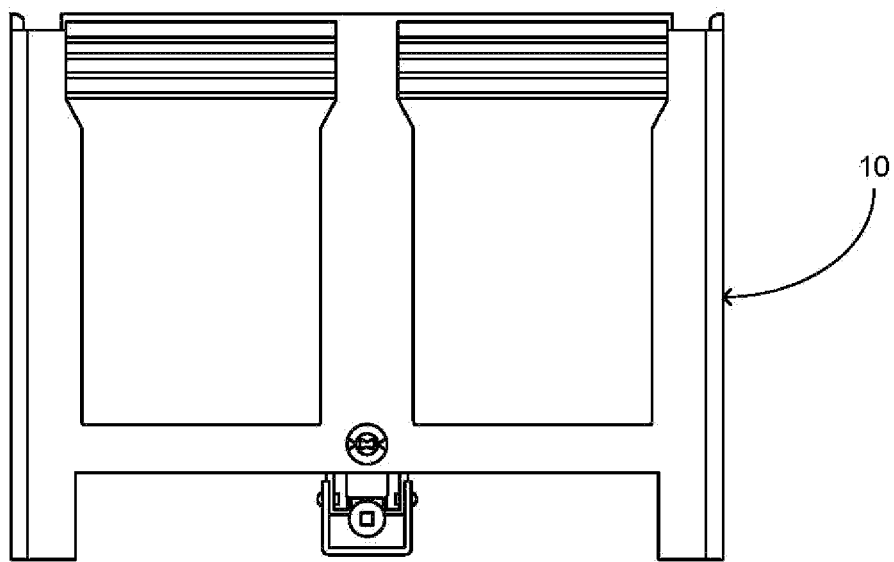
FIG. 9C is a front view of the storage bin of the present invention.
Figure 9D:
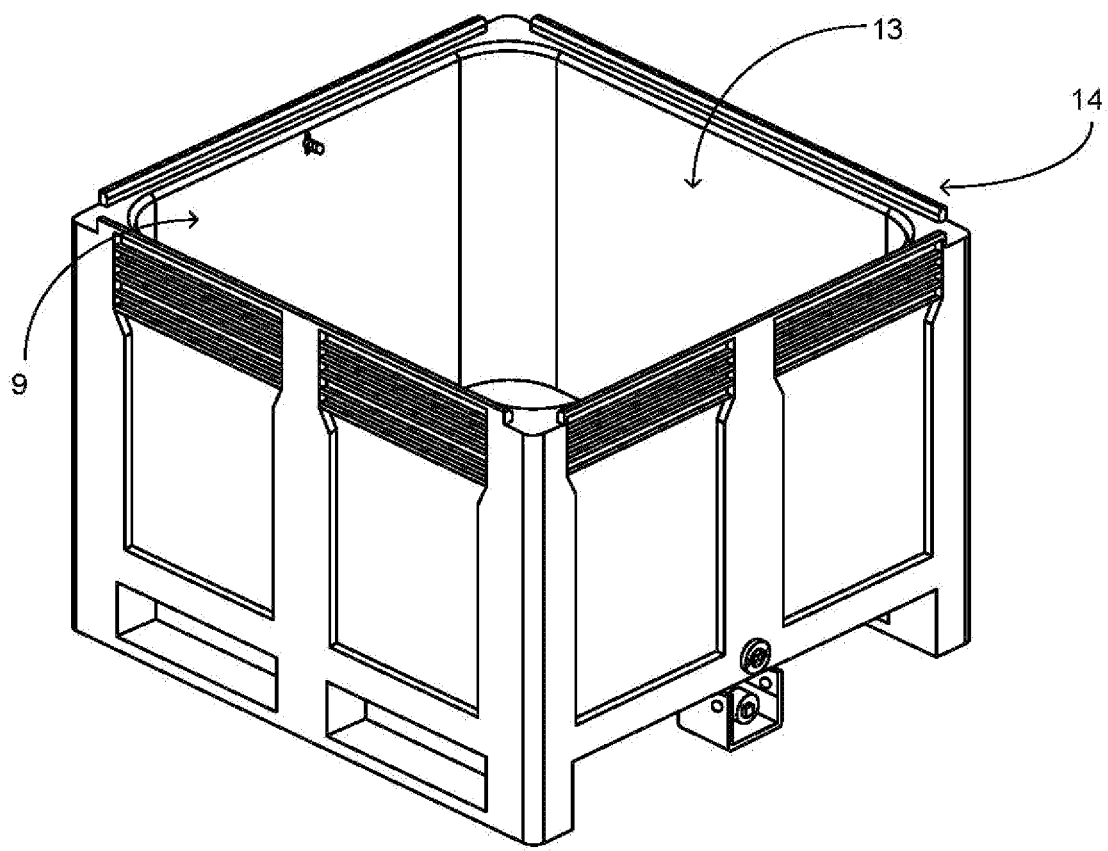
FIG. 9D is a perspective view of the storage bin.
Figure 10A:
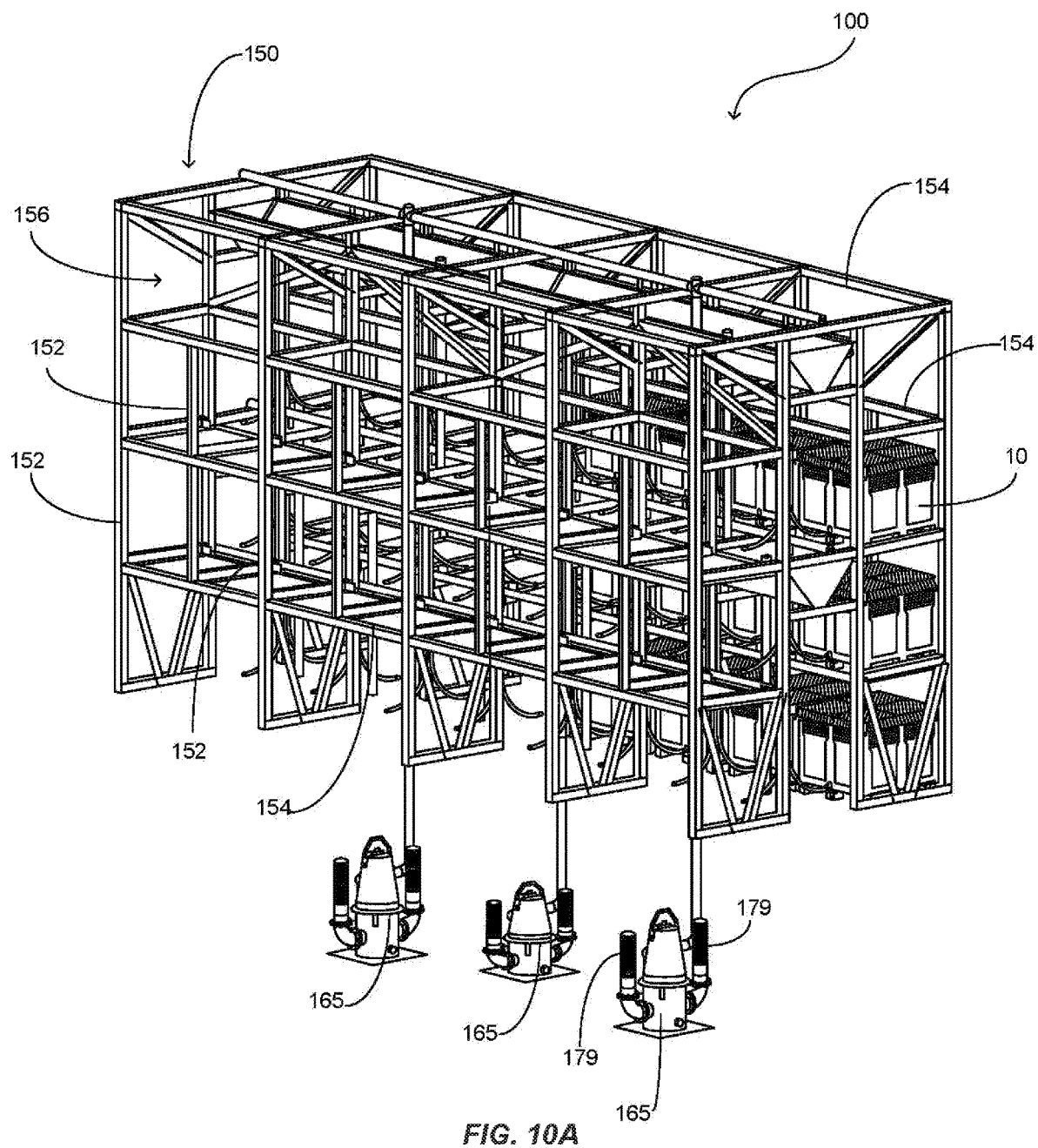
FIG. 10A is a perspective view of the shelving assembly of the present invention having storage bins operably coupled thereto.
Figure 10B:
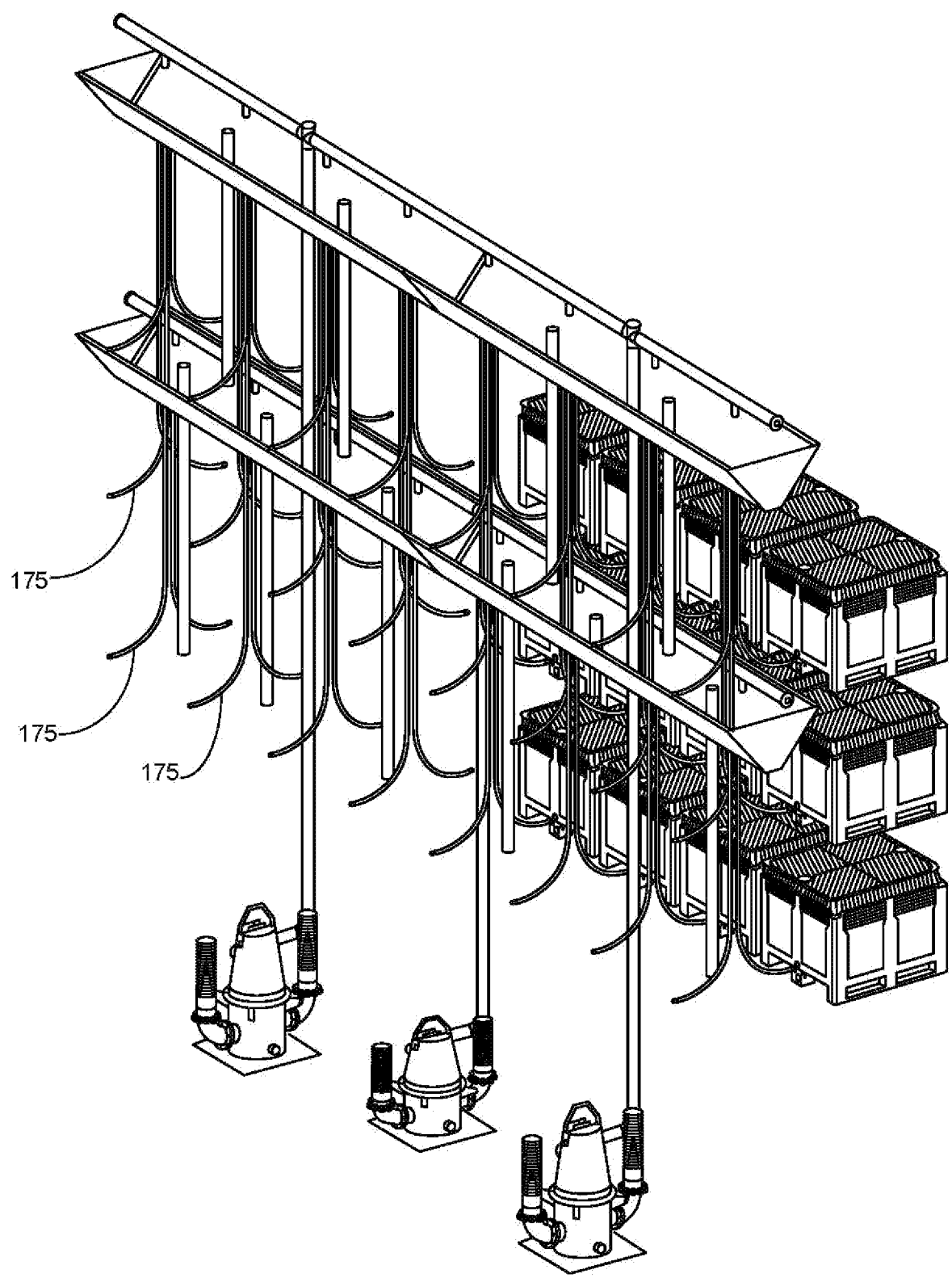
FIG. 10B is a perspective view of the air and water supply assembly operably coupled to storage bins.
Figure 11C:
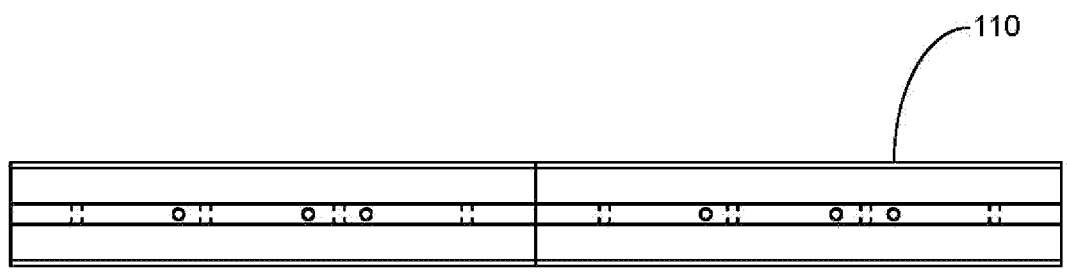
FIG. 11C is a top view of a funnel member of the shelving assembly.
Figure 11D:
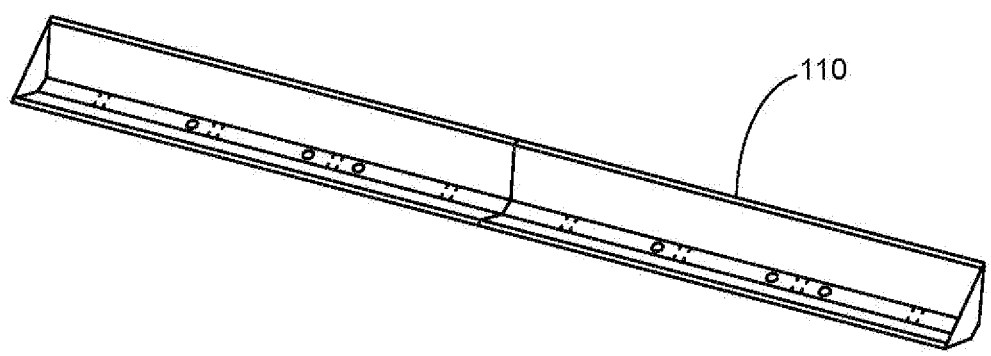
FIG. 11D is a perspective view of the funnel member of the shelving assembly.

Referring in particular to FIG. 7A-7C, the air and water hose assembly 40 is illustrated therein. The air and water hose assembly 40 is operable to provide introduction and replenishment of water and air into the interior volume 13 of the storage bin 10. The air and water hose assembly 40 is secured to the inner surface of the bottom of the storage bin 10 utilizing suitable durable techniques. The air supply is introduced through the upper air adapter 45 traveling through vertical air tube member 46 into the lower air adapter 47. The lower air adapter 47 is operably coupled to the air hose assembly that is comprised of a first lateral air hose member 50, a second lateral air hose member 51, a first longitudinal air hose member 52 and a second longitudinal air hose member 53. The air hose assembly is operable to introduce a supply of air into the bottom of the interior volume 13 of the storage bin 10. The first longitudinal air hose member 52 and second longitudinal air hose member 53 are perpendicular to the first lateral air hose member 50 and second lateral air hose member 51 respectively wherein the arrangement thereof provides introduction along three walls 11 of the storage bin 10. This arrangement provides the necessary volume of air to ensure optimal conditions for the crabs or other species stored in the interior volume 13.

The air and water hose assembly 40 includes a water hose assembly that is comprised of a water introduction pipe member 60, a water crossmember pipe 61, a first longitudinal water pipe member 62 and a second longitudinal water pipe member 63 all being fluidly coupled to facilitate water flow therethrough. The water introduction pipe member 60 is operably coupled to a supply hose 67 that is fluidly coupled to funnel member 110 as is further discussed herein. The first longitudinal water pipe member 62 and second longitudinal water pipe member 63 include a plurality of apertures 64 wherein the apertures 64 provide a normalized distribution of waterflow into the bottom of the interior volume 13 of the storage bin 10. The aforementioned distribution of waterflow in combination with the air introduction provides a more sustainable environment for crabs or other species disposed within the interior volume 13. While a particular configuration for the air and water hose assembly 40 has been illustrated and discussed herein, it is contemplated within the scope of the present invention that the air and water hose assembly 40 could be provided in alternate configurations to achieve the desired objective discussed herein.

A detailed view of the upper air adapter 45 is illustrated herein in FIG. 5A-5C. The upper air adapter 45 is operably coupled to an air source and provides an element to provide an air supply to the air hose assembly. The upper air adapter 45 includes a top portion 71 operably coupled to a bottom portion 72 being sealably coupled with o-ring 73. The top portion 71 includes threaded aperture 74 configured to be operably coupled to an air intake hose. Bottom portion 72 additionally includes a threaded aperture 75 configured to be operably coupled to air tube member 46. Bottom portion 72 is operably coupled to the top portion 71 employing threaded portion 76 wherein the threaded portion 76 includes passage 77 therethrough so as to permit airflow through the upper air adapter 45. It is contemplated within the scope of the present invention that the upper air adapter 45 could be constructed in alternate manners in order to achieve the desired objective discussed herein.

Lower air adapter 47 is illustrated herein in FIGS. 6A and 6B. The lower air adapter 47 includes body 81 have first barb member 82 integrally formed therewith. The first barb member 82 includes hollow passage 83 that extends into the body 81 and is operably coupled with passage 84. Passage 84 has releasably coupled thereto second barb member 85 wherein the second barb member 85 is perpendicular to the first barb member 82. The first barb member 82 and second barb member 85 are configured to operably couple with conventional rubber or plastic hose members.

FIG. 3A through FIG. 3D illustrates the stopper valve 120 that is operably coupled to drain valve 30 provides control of the water volume within the interior volume 13 of the storage bin 10. Stopper valve 120 includes male portion 121, o-ring 122, spacer 123, female portion 124, fastener 125, plug member 126 and keeper 127. The keeper 127 is employed to releasably secure the plug member 126 to the female portion 124 and either permit or inhibit water from passing through the passage 128. Placement of the stopper valve 120 provides a technique to either fill or drain the interior volume 13 of the storage bin 10.

Illustrated herein in FIGS. 10A through 11B is the shelving assembly 150 of the present invention. The shelving assembly 150 is provided in order to minimize the footprint of a plurality of storage bins 10 by providing vertical storage thereof and further ensure proper water and air flow into each storage bin 10. The shelving assembly 150 includes a plurality of vertical support members 152 and horizontal support members 154 arranged to create the cubical spaces 156 configured to receive and retain the storage bins 10 therein. A preferred embodiment of the shelving assembly 150 includes four levels but it should be understood within the scope of the present invention that the shelving assembly 150 could be provided having less than or more than four levels. The shelving assembly 150 includes vertical supply pipes 160 that are operably coupled to water pumps 165 at the lower end thereof. At each level, the vertical supply pipe 160 is fluidly coupled with horizontal supply pipe 170. The horizontal supply pipe 170 is disposed within the funnel member 110 and provides the filling of the funnel member 110 with water from the water pumps 165. The funnel members 110 have operably coupled thereto a plurality of storage bind supply hoses 175 that are operably coupled to the storage bins 10. The funnel members 110 are placed above the level on which the storage bins 10 are located and are fluidly coupled thereto. The horizontal supply pipe 170 distributes water into the funnel members 110 and as the water pressure increases, oxygen concentration will increase to simultaneously provide an air intake connection. It should be understood within the scope of the present invention that the quantity of water pumps 165 could vary based upon the volume of water needed to supply a quantity of storage bins 10. It should further be noted that the water pumps 165 of the present invention have two discharge members 179 in order to be operably coupled to a desired size of shelving assembly 150.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A live animal storage system configured to maintain an optimal environment for live animals disposed therein wherein the live animal storage system comprises:
    a shelving assembly, said shelving assembly having a multitude of vertical support members and horizontal support members wherein said vertical support members and said horizontal support members are operably coupled to create cubical spaces, said shelving assembly having a plurality of horizontal levels stacked vertically, said shelving assembly further having funnel members, said funnel members being horizontally oriented having an interior volume configured to receive water therein, said funnel members being located above each of said plurality of horizontal levels;
    a plurality of storage bins, said plurality of storage bins having four walls and a bottom integrally formed to create an interior volume, said plurality of storage bins having an upper perimeter edge defining an opening located at a top end of the plurality of storage bins;
    an air and water hose assembly, said air and water hose assembly being disposed in each of said plurality of storage bins, said air and water hose assembly having water hose assembly, said water hose assembly configured to distribute water into the interior volume of the plurality of storage bins, said air and water hose assembly having an air hose assembly, said air hose assembly being configured to distribute air into said interior volume of the plurality of storage bins;
    said air hose assembly comprising a first longitudinal hose member and a second longitudinal hose member, said first longitudinal hose member and said second longitudinal hose member being adjacent opposing walls of said plurality of storage bins;
    said water hose assembly comprising a first longitudinal water pipe and a second longitudinal water pipe, said first longitudinal water pipe and said second longitudinal water pipe being parallel with said first longitudinal hose member and said second longitudinal hose member, said first longitudinal water pipe and said second longitudinal water pipe further being in between said first longitudinal hose member and said second longitudinal hose member; and
    at least one water pump, said at least one water pump being operably coupled to said funnel members, said at least one water pump configured to provide water into the funnel members wherein the funnel members are operably coupled to each of said plurality of storage bins.

2. The live animal storage system configured to maintain an optimal environment for live animals disposed therein as recited in claim 1, wherein said plurality of storage bins include a cage perimeter member, said cage perimeter member being superposed on the upper perimeter edge of said plurality of storage bins extending upward therefrom, said cage perimeter member having an angular orientation inwards towards said interior volume of said plurality of storage bins.

3. The live animal storage system configured to maintain an optimal environment for live animals disposed therein as recited in claim 2, and further including an upper cage member, said upper cage member being superposed on said cage perimeter member of each of said plurality of storage bins, said upper cage member operable to cover the opening of each of said plurality of storage bins.

4. The live animal storage system configured to maintain an optimal environment for live animals disposed therein as recited in claim 1, wherein said first longitudinal water pipe and said second longitudinal water pipe further include a plurality of apertures configured to have water egress therefrom.

5. The live animal storage system configured to maintain an optimal environment for live animals disposed therein as recited in claim 4, wherein said air hose assembly further includes a vertical air tube member, said vertical air tube member having a first end and a second end, said first end of said vertical air tube member being proximate said top of said plurality of storage bins, said second end of said vertical air tube member being proximate said bottom of said plurality of storage bins.

6. The live animal storage system configured to maintain an optimal environment for live animals disposed therein as recited in claim 5, and further including an upper air adapter, said upper air adapter being coupled to said vertical air tube member at the first end thereof.

7. The live animal storage system configured to maintain an optimal environment for live animals disposed therein as recited in claim 6, and further including a lower air adapter, said lower air adapter being coupled to said vertical air tube member proximate said second end thereof.

8. The live animal storage system configured to maintain an optimal environment for live animals disposed therein as recited in claim 7, wherein said plurality of storage bins further include a drain assembly, said drain assembly being coupled to said plurality of storage bins proximate the bottom thereof, said drain assembly further having a stopper member releasably coupled thereto.

* * * * *